(12) United States Patent
Palmer et al.

(10) Patent No.: US 8,674,211 B1
(45) Date of Patent: Mar. 18, 2014

(54) SOLAR CHARGING HANDBAG

(76) Inventors: S. Jane Palmer, Chicago, IL (US); Marianne Fairbanks, Chicago, IL (US)

( * ) Notice: Subject to any disclaimer, the term of this patent is extended or adjusted under 35 U.S.C. 154(b) by 1758 days.

(21) Appl. No.: 11/101,083

(22) Filed: Apr. 7, 2005

(51) Int. Cl.
*H01L 31/048* (2006.01)

(52) U.S. Cl.
USPC ............ 136/251; 136/244; 136/245; 320/101

(58) Field of Classification Search
USPC ............................. 136/251, 244, 245; 320/101
See application file for complete search history.

(56) References Cited

U.S. PATENT DOCUMENTS

| | | | | | |
|---|---|---|---|---|---|
| 3,963,102 | A | * | 6/1976 | Carp | 190/108 |
| 4,084,085 | A | * | 4/1978 | Kim | 362/135 |
| 4,636,578 | A | * | 1/1987 | Feinberg | 136/251 |
| 4,739,809 | A | * | 4/1988 | Adams | 150/112 |
| 4,953,603 | A | * | 9/1990 | Holden | 150/154 |
| 5,855,692 | A | * | 1/1999 | Kaji et al. | 136/245 |
| 6,130,379 | A | * | 10/2000 | Shiotsuka et al. | 136/251 |
| D442,782 | S | * | 5/2001 | Hersh et al. | D3/319 |
| 6,414,236 | B1 | * | 7/2002 | Kataoka et al. | 136/251 |
| 6,637,484 | B1 | * | 10/2003 | Kraft | 150/112 |
| 6,870,089 | B1 | | 3/2005 | Gray | |
| 2002/0017545 | A1 | * | 2/2002 | Badillo et al. | 224/675 |
| 2005/0140331 | A1 | * | 6/2005 | McQuade | 320/101 |

FOREIGN PATENT DOCUMENTS

| | | | | |
|---|---|---|---|---|
| JP | 10137035 | * | 5/1998 | A45F 3/02 |
| JP | 11-299528 | | 11/1999 | |

OTHER PUBLICATIONS

"DuPont Cordura®—Benefits of Cordura® ", Jul. 2003, Accessed from http://web.archive.org/web/20030711112549/cordura.com/benefits.html.*
Osamu Kumakawa, May 26, 1998, JP 10-137035 A English translation by FLS, Inc.*
Row, D.K., United Artists, "'Do It Yourself' Art Provocateurs From the U.S. and Europe Show Work At The Laurelhurst Theater for a Night of Rampant Creativity," The Oregonian (Newspaper), Mar. 13, 2003, Portland, Oregon (1 page).
Ramos, Nestor, Portland or Bust! Do-it-yourselfers From All Over the World Flocked to the International Arts Group Exhibition At the Laurelhurst Theater & Pub, The Oregonian (Newspaper) Mar. 16, 2003, Portland, Oregon (3 pages).
Palmer, James R., Statement, Jul. 16, 2008, Knoxville, TN, (3 pages).

* cited by examiner

*Primary Examiner* — Golam Mowla
(74) *Attorney, Agent, or Firm* — James R. Palmer; Luedeka Neely Group, PC

(57) ABSTRACT

A solar charging handbag for recharging electronic appliances such as cellular telephones, personal digital assistants (PDAs), digital cameras, and Digital Versatile Disc (DVD) players, MP3 players, gaming stations, and similar devices. A solar panel is connected to a charge control module and the electronic appliance is plugged into the charge control module. The charge control module may incorporate a rechargeable battery or battery pack.

12 Claims, 5 Drawing Sheets

SOLAR CHARGING HANDBAG

CROSS REFERENCES TO RELATED APPLICATIONS

This patent application claims priority from and is related to U.S. Provisional Patent Application Ser. No. 60/561,163 filed Apr. 10, 2004, entitled: Solar Charging Handbag. This U.S. Provisional Patent Application is incorporated by reference in its entirety herein.

FIELD

This invention relates to the field of battery charging equipment. More particularly, this invention relates to battery chargers using solar energy.

BACKGROUND

In recent years there has been a proliferation of personal electronic appliances that are typically designed to be portable and carried for continuously available use. Examples of such appliances are cellular telephones, personal digital assistants (PDAs), digital cameras, and Digital Versatile Disc (DVD) players. In general these appliances are powered by batteries. While it is possible to carry spare batteries, this is often inconvenient for the user and requires additional expenditures. Most batteries in such appliances are rechargeable. Often there are optional means provided for recharging the batteries, such as adapters for automobile cigarette lighters and adapters for household electrical current recharging. However, such existing technology does not meet the needs of many users of personal electronic devices. For example, in many circumstances the user does not have access to such sources of power when such power is needed for recharging batteries. What is needed therefore is a portable means for recharging the batteries of personal electronic appliances. It would be particularly helpful if the means were independent of additional devices or sources of energy. It would also be helpful if the means were integrated into a user's other needs related to the use of the electronic appliance, such as storing or carrying the electronic appliance.

SUMMARY

In the present invention, a solar charging handbag is provided, where the handbag includes a compartment constructed at least in part of sheet material. The compartment is configured for holding an electronic appliance. An aperture is provided in the sheet material and a solar panel is disposed to receive ambient light through the aperture and thereby generate electrical energy. A charge control module is retained with the compartment. The charge control module is configured for connecting a charging line to the electronic appliance. There is an electrical connection between the solar panel and the charge control module, so that at least a portion of the electrical energy generated by the solar panel recharges the electronic appliance when the electronic appliance is connected to the charge control module through the charging line.

In an alternate embodiment, a handbag has a compartment constructed at least in part of a sheet material, the compartment being configured for holding a an electronic appliance. A solar panel is attached to the compartment, and the solar panel has solar cells laminated between a backing material and a protective material and the solar panel is configured to receive ambient light and thereby generate electrical energy. There is a charge control module retained with the compartment, and the charge control module configured for connecting a charging line to the electronic appliance. An electrical connection is provided between the solar panel and the charge control module, so that whereby at least a portion of the electrical energy generated by the solar panel recharges the electronic appliance when the electronic appliance is connected to the charge control module through the charging line.

In a further embodiment, a solar charging handbag has a compartment configured for holding an electronic appliance and for storing a complement of personal articles. The compartment has a front panel and an opening, and there is a flap having a first portion that substantially covers the opening and a second portion constructed of sheet material that overlaps at least a portion of the front panel when the compartment stores the complement of personal articles. A solar panel is attached to the second portion of the flap, and the solar panel is configured to receive ambient light and thereby generate electrical energy. A charge control module is retained with the compartment, and the charge control module configured for connecting a charging line to the electronic appliance. There is an electrical connection between the solar panel and the charge control module, and at least a portion of the electrical energy generated by the solar panel recharges the electronic appliance when the electronic appliance is connected to the charge control module through the charging line.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
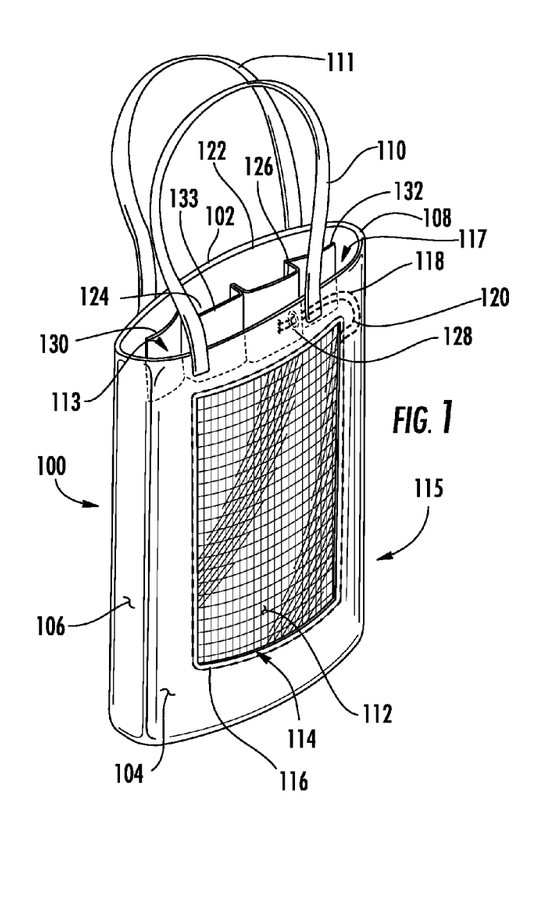
FIG. 1 is a side perspective view of one embodiment based upon a tote bag design.

With reference now to FIG. 1, one embodiment of a solar charging handbag 100 is depicted. The term "handbag" as used herein refers to various carrying bags and cases, including tote bags, purses, messenger bags, briefcases, suitcases, satchels, backpacks, pouches, insulated containers, and so forth. In this embodiment of FIG. 1 the handbag has a back panel 102, an opposing front panel 104, a first side panel 106 and an opposing second side panel 108, and a bottom panel 109 (shown in FIG. 2). In the most preferred embodiments back panel 102, opposing front panel 104, first side panel 106 and opposing second side panel 108 and bottom panel 109 are composed of sheet material. "Sheet material" as referred to herein includes fabrics such as canvas, linen, denim, oil cloth, knit and other non-woven fabrics, and so forth. Leather, vinyl, polymers, plastic films and sheets, and sheet metal are other forms of sheet material. First carrying strap 110 is attached to the front panel 104 and second carrying strap 111 is attached to the back panel 102. The back panel 102, the front panel 104, side panel 106, and side panel 108 combine to form a compartment 113. Compartment 113 has an opening 117 that is formed at least in part by a portion of the top edge of the front panel 104 and the back panel 102. Preferably compartment 113 is sized to carry a complement of personal articles. A complement of personal articles constitutes items that are typically carried in a purse or a briefcase, such as a wallet, check book, makeup, grooming aids, keys, books, papers, and so forth. Various embodiments may employ a different size compartment 113 in order to accommodate different user's needs.

In this embodiment of FIG. 1, a solar panel 112 is mounted behind aperture 114 in front panel 104. Thus configured, solar panel 112 receives ambient light through aperture 114 whereby solar panel 112 generates electrical energy. In this configuration solar panel 112 is affixed to front panel 104 by stitching 116. In alternate embodiments solar panel 112 may be affixed directly to the exterior surface 115 of front panel 104, without aperture 114, using adhesives, rivets, or other attachment mechanisms. Preferably the solar panel 112 is a flexible solar panel, such as a rollable panel available from Iowa Thin Film Technologies, Inc. in Ames, Iowa. A first electrical lead 118 and a second electrical lead 120 extend from solar panel 112. In this embodiment the first electrical lead is attached to the positive terminal of solar panel 112, and the second electrical lead is attached to the negative terminal of solar panel 112. First electrical lead 118 and second electrical lead 120 constitute electrical connections, and they may be configured as twisted pairs or coaxial wires. In this embodiment, solar charging handbag 100 has a lining 122 that provides a backing to back panel 102, front panel 104, first side panel 106 and second side panel 106, and first electrical lead 118 and second electrical lead 120 pass around bag 100 between lining 122 and front panel 104, and between lining 122 and second side panel 108, and between lining 122 and back panel 102.

In this embodiment of FIG. 1 solar charging handbag 100 has a first pocket 124 and a second pocket 126 affixed to the lining 122 on back panel 102 at the top of compartment 113. First pocket 124 and second pocket 126 are configure to protrude into compartment 113. First electrical lead 118 and second electrical lead 120 pass through a grommet 128 installed in lining 122 and into second pocket 126. Additionally, a first auxiliary pocket 130 and a second auxiliary pocket 132 are provided for supplemental storage. First pocket 124, second pocket 126, first auxiliary pocket 130, and second auxiliary pocket 132 are specific embodiments of fastening mechanisms for securing component devices of this embodiment. Alternate embodiments of fastening mechanisms include hook and loop fabric fasteners, elastic straps, clips, cups, or similar devices. Such fastening mechanisms securably restrain their enclosed or affixed component devices, such that the devices are contained in a defined space but the component devices can be accessed or removed if needed.

In the embodiment of FIG. 1, first pocket 124, second pocket 126, first auxiliary pocket 130, and second auxiliary pocket 132 are fabricated from a band of fastening material 133 is attached that extends across the top of the entire lateral extent of back panel 102, and the fastening material 133 is attached to the lining 122 at several locations to form first pocket 124, second pocket 126, first auxiliary pocket 130, and second auxiliary pocket 132. While first pocket 124, second pocket 126, first auxiliary pocket 130, and second auxiliary pocket 132 are at the top of back panel 102 in this embodiment in alternate embodiments first pocket 124, second pocket 126, first auxiliary pocket 130, and second auxiliary pocket 132 could be at the bottom of back panel 102. In further alternate embodiments first pocket 124, second pocket 126, first auxiliary pocket 130, and second auxiliary pocket 132 could be affixed to front panel 104. However, to counterbalance the weight of components of the solar charging handbag 100, in the most preferred embodiments, solar panel 112 is affixed to one panel and first pocket 124, second pocket 126, first auxiliary pocket 130, and second auxiliary pocket 132 are affixed to the panel opposing the panel to which the solar panel 112 is affixed.

Figure 2:
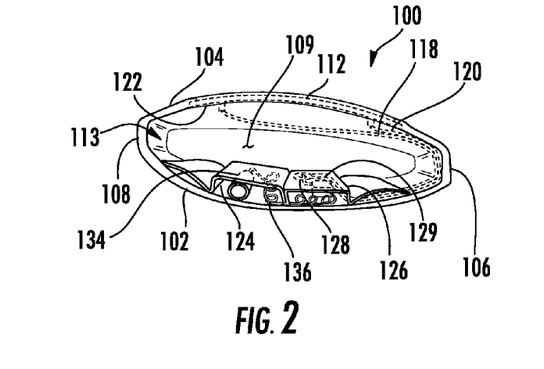
FIG. 2. is a top perspective view of a tote bag embodiment.

FIG. 2 depicts a top perspective view of further details of one embodiment. Solar panel 112 is seen to be affixed to front panel 104. First electrical lead 118 and second electrical lead 120 are attached to solar panel 112, and pass between lining 122 and front panel 104, between side panel 106 and lining 122, and between back panel 102 and lining 122. Then first lead 118 and second lead 120 pass through grommet 128 in lining 122 into pocket 126 where they connect with charge control module 129. Charge control module 129 is seen connected to automobile cigarette lighter female connector 134 via female connector wire 136. Charge control module 129 is retained with compartment 113 by pocket 126. In some embodiments charge control module 129 may be stored in a pocket that is disposed on an exterior surface, such as exterior surface 115. In such embodiments the charge control module 129 is still considered to be retained with the compartment defined in part by the exterior surface.

Figure 3:
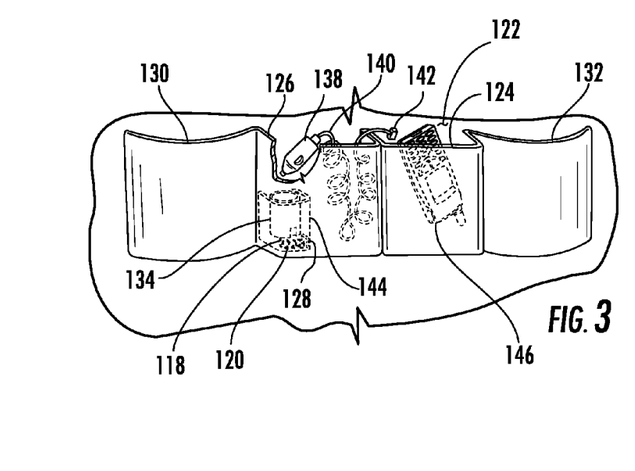
FIG. 3 is a detailed view of additional components of a solar charging handbag and mechanisms for fastening certain components in the embodiment of FIG. 1.

Referring now to FIG. 3, first lead 118 and second electrical lead 120 are shown running from the solar panel 112 to front panel 104 between side panel 106, back panel 108, and lining 122, emerging from grommet 128 that is installed in lining 122. It is beneficial to have first pocket 124, and second pocket 126 disposed on a panel (i.e., back panel 102) that is opposed from the panel (i.e., front panel 104) upon which solar panel 112 is disposed, so that the weight of the contents of first pocket 124 and second pocket 126 counterbalance the weight of solar panel 112. In this embodiment an automobile cigarette lighter female connector 134 is connected to first lead 118 and second lead 120, and automobile cigarette lighter female connector 134 is secured in a plug pocket 144 which is inside second pocket 126. Plug pocket 144 used in this embodiment is another example of a fastening mechanism. Automobile cigarette lighter female connector 134 is an example of an electronic appliance plug receptacle. The use of automobile cigarette lighter female connector 134 in solar charger handbag 100 is particularly beneficial because most electronic devices have an accessory for recharging their batteries using an automobile cigarette lighter connection. Also depicted in FIG. 3 is an electronic appliance cigarette lighter male connector 138 which plugs into automobile cigarette lighter female connector 134. Male connector wire 140 extends from cigarette lighter male connector 138 to electronic appliance connector 142. Electronic appliance 146, a cellular telephone in this embodiment, can then be connected to electronic appliance connector 142 to recharge built-in batteries in electronic appliance 146.

It is important in many embodiments that a blocking diode be inserted in the circuitry between the solar cells and any battery being recharged. A low-loss Schottky diode is preferred. The reason for including a blocking diode is that if the solar cells are not generating sufficient voltage potential, which for example, will occur when there is insufficient ambient light, the solar cells will drain the battery unless a blocking diode is inserted in the circuit to prevent this from occurring. Some solar panels, including some models of the rollable panels available from Iowa Thin Film Technologies, Inc. in Ames, Iowa have a blocking diode built into the solar panel. Also, some automobile cigarette lighter male connectors that are designed for portable electronic applications have built-in blocking diodes.

Figure 4:
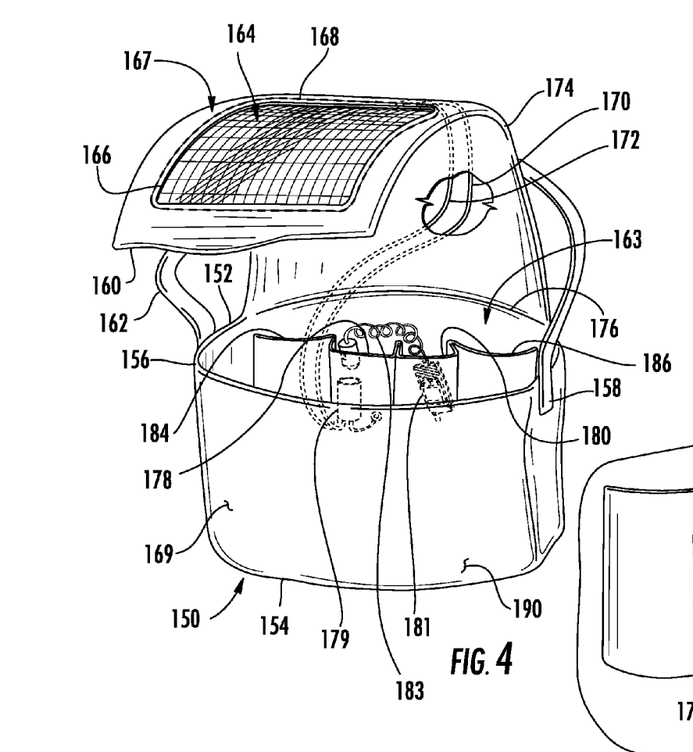
FIG. 4 is a side perspective view of another alternate embodiment, showing a messenger style design.

FIG. 4 presents a further alternate embodiment. Solar charging handbag 150 is shown having a back panel 152, an opposing front panel 154, a first side panel 156, an opposing second side panel 158, and a bottom panel 190 which substantially form compartment 163. Preferably back panel 152, an opposing front panel 154, a first side panel 156, an opposing second side panel 158, and a bottom panel 190 are formed at least in part from sheet material. Back panel 152, opposing front panel 154, first side panel 156, opposing second side panel 158, and bottom panel 190 have an exterior surface 169. This embodiment also incorporates a flap panel 160 which is attached to the top of back panel 152. In such embodiments flap panel 160 is considered to be opposing back panel 152 because in normal passive standing, flap panel 160 rests atop front panel 154 which opposes back panel 152. Flap 160 has an exterior surface 167. A carrying strap 162 is shown attached to first side panel 156 and second side panel 158. Solar panel 164 is shown affixed in aperture 166 which has been cut into flap 160. Preferably, solar panel 166 is a flexible 15.4V 100 mA Iowa Thin Film solar panel, or a similar panel having solar cells laminated between a Tefzel® film on the front and Cordura® fabric on the rear. Tefzel® is chosen for its near-100% transparency. Cordura® is a tough nylon material. As illustrated, the backing of solar panel 164 is disposed behind aperture 166, held in place by stitching 168 through the Cordura® backing of solar panel 164. Preferably, flap 160 is configured such that solar panel 160 overlaps at least a portion of front panel 154 when compartment 163 contains a complement of personal articles and solar panel 160 overlaps at least a portion of front panel 154 when compartment 163 is substantially void of personal articles. A flap lining 174 is affixed to the underside of flap 160. A back panel lining 176 is affixed to back panel 152 inside compartment 163. A first pocket 178 and a second pocket 180 are provided for storage of a charge control module 179 and electronic appliance 181 respectively. Charge control module 179 is retained with compartment 163 by pocket 178. In some embodiments charge control module 179 may be stored in a pocket that is disposed on an exterior surface, such as exterior surface 167 or 169. In such embodiments the charge control module 179 is still considered to be retained with the compartment (e.g., 163) defined in part by the exterior surface(s) (e.g., 167 and 169). Charge control module 179 and electronic appliance 181 are disposed to be connected by charging line 183. Auxiliary pockets 184 and 186 are provide for storage of miscellaneous accessory items. A first electrical lead 170 and a second electrical lead 172 are attached to solar panel 164 and run between flap panel 160 and flap lining 174, and between back panel 152 and back panel lining 176. In this embodiment the first electrical lead 170 is attached to the positive terminal of solar panel 112, and the second electrical lead 172 is attached to the negative terminal of solar panel 112.

Figure 5:
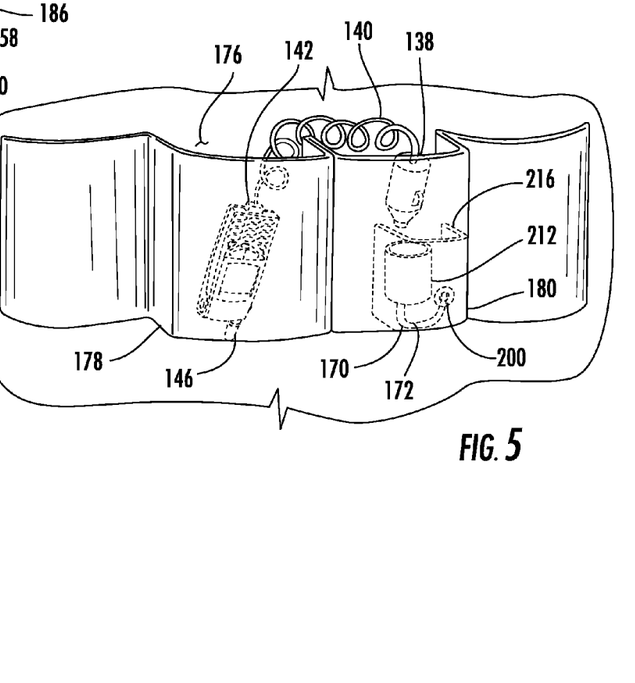
FIG. 5 is detailed view of mechanisms for fastening solar charging handbag components in the embodiment of FIG. 4.

FIG. 5 shows further details of certain components in one embodiment. First electrical lead 170 and second electrical lead 172 are shown emerging from grommet 200 which is installed in back panel lining 176. First electrical lead 170 and second electrical lead 172 are connected to automobile cigarette lighter female connector 212. Also depicted in FIG. 5 is an electronic appliance cigarette lighter male connector 138 which plugs into automobile cigarette lighter female connector 212. Male connector wire 140 extends from cigarette lighter male connector 138 to electronic appliance connector 142. Electronic appliance 146 is stowed in pocket 146 and is plugged into electronic appliance connector 142 to recharge built-in batteries in electronic appliance 146. Electronic appliance 146 is illustrated here as a cell phone; in alternate embodiments electronic appliance 146 may be a music player, gaming device, camera, or other electronic device.

Figures 6, 7:
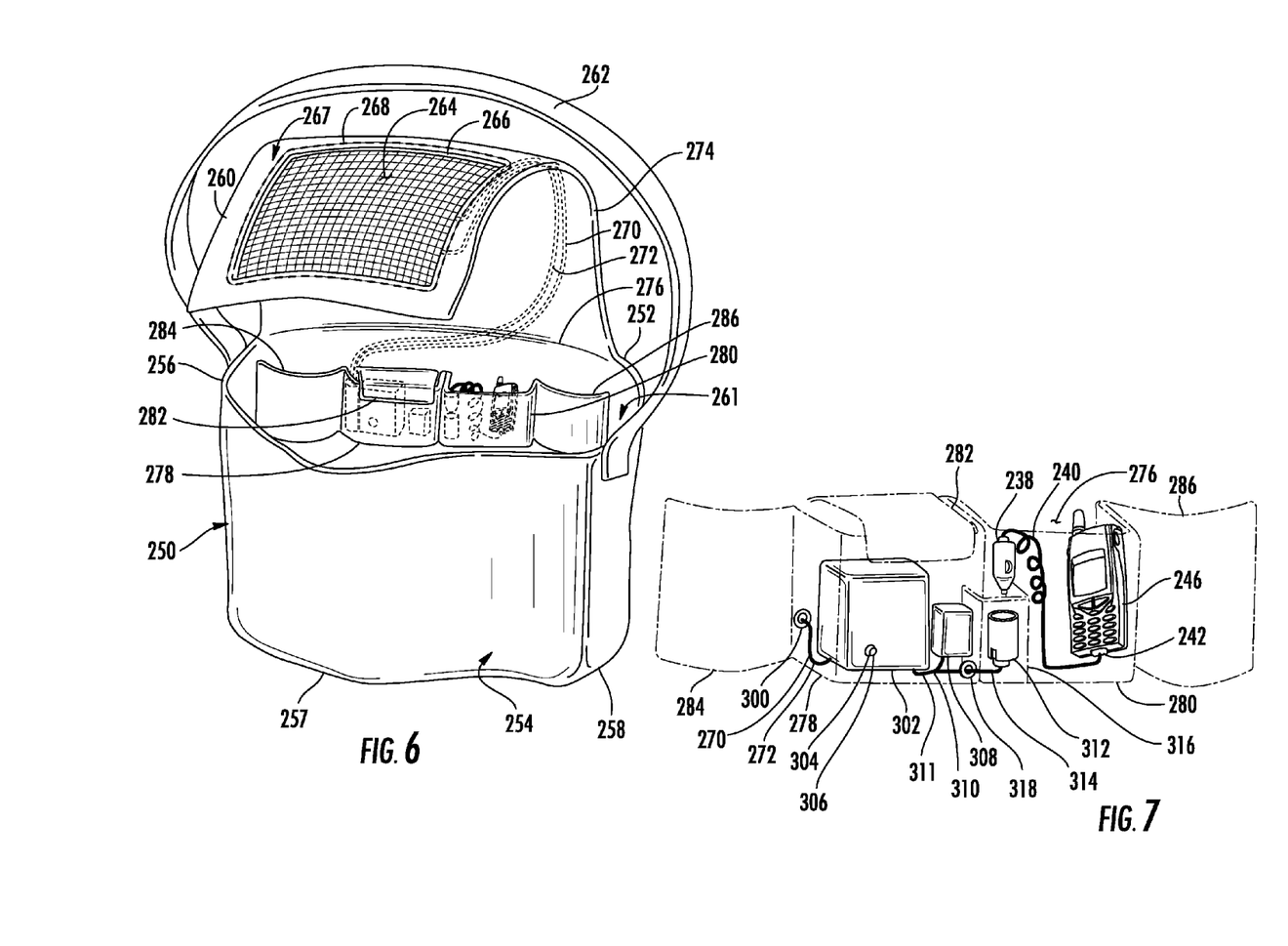
FIG. 6 is a side perspective view of another embodiment.
FIG. 7 is a detailed view of additional components of a solar charging handbag and mechanisms for fastening certain components in the embodiment of FIG. 6.

FIG. 6 depicts a further alternate embodiment. Solar charging handbag 250 is shown having a back panel 252 and an opposing front panel 254, a first side panel 256 and a second opposing side panel 258. Back panel 252, opposing front panel 254 first side panel 256, and second side panel 258, and bottom panel 257 form compartment 261. This embodiment also incorporates a flap panel 260 which is attached to the top of back panel 252. In such embodiments flap panel 260 is considered to be opposing back panel 252 because in normal passive standing, flap panel 260 rests atop front panel 254 which opposes back panel 252. Flap 260 has front surface 267. A carrying strap 262 is shown attached to first side panel 256 and second side panel 258. A solar panel 264 is visible through aperture 266 which has been cut into flap 260. Solar panel is affixed to flap 260 by stitching 268. A flap lining 274 is affixed to the underside of flap 260. A back panel lining 276 is affixed to back panel 252 inside compartment 263. A first electrical lead 270 and a second electrical lead 272 are attached to solar panel 264 and run between flap panel 260 and flap lining 274, and between back panel 252 and back panel lining 276. In this embodiment the first electrical lead 270 is attached to the positive terminal of solar panel 264, and the second electrical lead 272 is attached to the negative terminal of solar panel 264. A first pocket 278 and a second pocket 280 are shown attached to the back panel lining 276, as are a first auxiliary pocket 284 and a second auxiliary pocket 286.

FIG. 7 depicts details of the embodiment of FIG. 6 with respect to first pocket 278 and second pocket 280, and contents thereof in this embodiment. First pocket 278 and second pocket 280 are examples of fastening mechanisms. First pocket 278 positions charge control module 302 in compartment 261 and second pocket 280 positions electronic appliance 246 in compartment 261. Pocket 278 is shown with a pocket flap 282 that retains charge control module 302 in pocket 278. Charge control module 302 (also referred to as a charge controller) may include a battery pack. When charger controller 302 includes a battery pack it is particularly beneficial that first pocket 278 that positions the battery pack and second pocket 280 that positions containing the charge control module 302 are positioned oppositely (as shown) across plug pocket 216 so that their weights are counter-balanced. Plug pocket 216 is disposed in pocket 280 and plug pocket 216 is an example of a fastening mechanism. Preferably plug pocket 216 retains automobile cigarette lighter female connector 212 in an upright position to allow easy access for plugging into automobile cigarette lighter female connector 212. First electrical lead 270 and second electrical lead 272 are shown emerging from grommet 300 which is installed in back panel lining 276. First lead 270 and second lead 272 connect to a charge control module 302. An example of such a charge control module is the model RA5 Battery Charger available from Iowa Thin Film Technologies, Inc. in Ames, Iowa. In alternate embodiments, charge control module 302 may consist simply of a 1N5817TR Schottky diode installed in the positive potential electrical lead (i.e., first electrical lead 270) and the diode is set into the circuit in the direction where the arrow (or marker on the diode) is oriented toward the positive terminal of the battery to be recharged. A common ground is provided by the second electrical lead 272. In such embodiments, additional protection for the battery may be provided by a protective circuit module in the electronic appliance.

FIG. 7 illustrates a further feature of some embodiments. An electrical connection consisting of a first lead 310 and a second lead 311 connects the output of charge control module 302 to automobile cigarette lighter female connector 312. Male connector wire 240 extends from cigarette lighter male connector 238 to electronic appliance connector 242. Electronic appliance 246 is plugged into electronic appliance connector 242 to recharge built-in batteries in electronic appliance 246. In addition, in this embodiment, a rechargeable battery 308 is connected across electrical first electrical lead 310 and second electrical lead 311. Automobile cigarette lighter female connector 312 is stowed in plug pocket 316 and is connected to rechargeable battery 308 via female connector wire 314 through grommet 318. Rechargeable battery 308 may, for example, be a 7.4V 700 mA lithium ion battery, a nickel cadmium battery, a nickel metal hydride battery, lithium polymer battery, or other rechargeable battery. However, if a lithium ion battery or lithium polymer battery is used, it is important to provide protection for the battery from overcharging or applying excess voltage to the battery. Such protection can come from a protection circuit module built into the rechargeable battery 312 or built into the charge control module 302.

Rechargeable battery 308 charges whenever power is available from charge control module 302, and provides a reserve of power whenever electronic appliance 246 is connected through automobile cigarette lighter female connector 312. Charging status indicator light emitting diode 304 is shown popping out through grommet 306 in the front of pocket 278 to show when rechargeable battery 308 is charging.

Figures 8A, 8B:
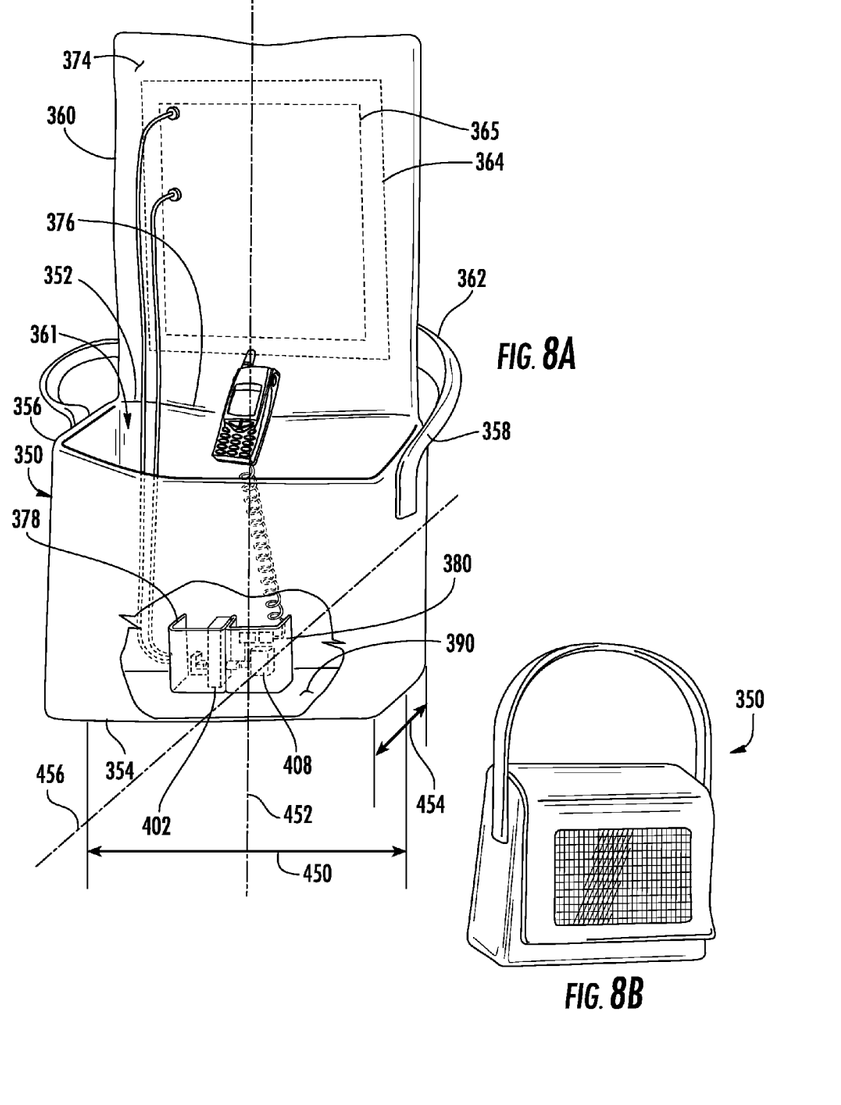
FIG. 8a is a cutaway perspective of an alternate embodiment.
FIG. 8b illustrates solar charging handbag in its configuration for carrying.

FIG. 8a provides a perspective view of a further alternate embodiment. Solar charging handbag 350 is shown having a back panel 352 and an opposing front panel 354, a first side panel 356 and a second opposing side panel 358. A bottom panel 290 attaches to the bottoms of back panel 352, front panel 354, first side panel 356, and second side panel 358. Back panel 352, front panel 354, first side panel 356, second side panel 358 and bottom panel 390 substantially define an interior compartment 361. This embodiment also incorporates a flap panel 360 which is attached to the top of back panel 352. In such embodiments flap panel 360 is considered to be opposing back panel 352 because in normal passive standing, flap panel 360 rests atop front panel 354 which opposes back panel 352. A carrying strap 362 is shown attached to first side panel 356 and second side panel 358. A solar panel 364 is shown affixed in flap panel 260 behind aperture 365 which has been cut into flap 360. A flap lining 374 is affixed to the underside of flap 360. A back panel lining 376 is affixed to back panel 352 inside compartment 361. A first pocket 378 and a second pocket 380 are shown attached to the back panel lining 376. A charge control module 402 is secured in first pocket 378 and a rechargeable battery 408 is secured in second pocket 380. There is a grommet in the lining of the back of the first pocket 378 where the wires from the solar panel come through the lining for the charge controller. The rechargeable battery 408 is connected to the charge control module 402 through wires that come through a grommet between the first pocket 378 and the second pocket 380. Back panel 352 has a lateral dimension 450, and first side panel 356 and second side panel 358 establish an average transverse dimension 454. The bisection of lateral dimension 450 establishes an axis of symmetry 452 that is perpendicular to the lateral dimension 452 and the transverse dimension 454. A third axis, the axis of balance 456 is perpendicular to both the transverse dimension and the axis of symmetry 452, and runs through the axis of symmetry 452 at the bottom of the back panel 352. In order to have solar charging handbag 350 hang straight, and rest evenly when set on bottom panel 390, first pocket 378 and second pocket 380 are located to position charge control module 378 and the rechargeable battery 408 at distances away from the axis of symmetry 452 such that the bag is substantially counter-balanced about the axis of symmetry 456. FIG. 8b illustrates solar charging handbag in its configuration for carrying.

Figure 9A:
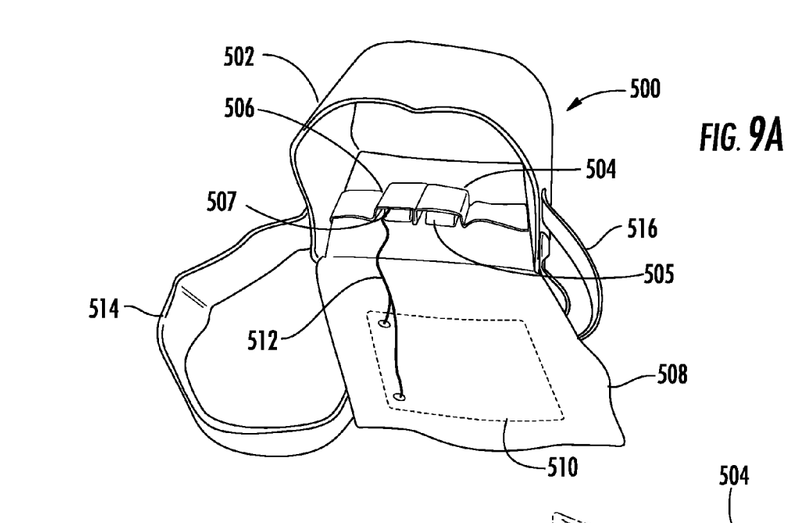
FIGS. 9a and 9b are perspective views of a backpack embodiment.

FIG. 9a illustrates a back-pack style solar charging handbag 500 shown opened and viewed from the perspective of looking into the bag from above and behind the bag. Solar charging handbag 500 has a compartment 502. Inside compartment 502 is an electronic appliance pocket 504 containing electronic appliance 505 and a charge control module pocket 506 containing charge control module 507. Preferably charge control module 507 includes a battery pack. Solar charging handbag 500 has a flap 508 (the back of which is shown) that has a solar panel 510 (shown in hidden lines) on the front of flap 508. Electrical leads 512 run from solar panel 510 to charge control module 507. Solar charging handbag has a first strap 514 and a second strap 516.

Figure 9B:
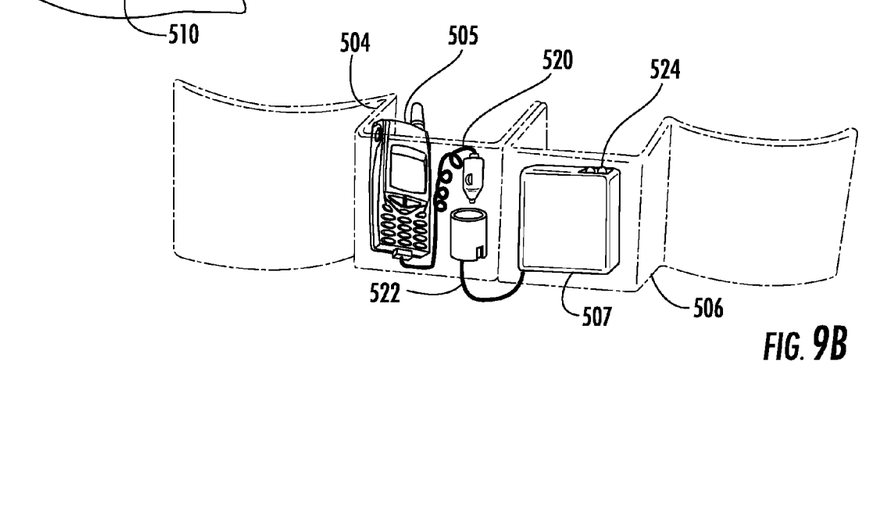

FIG. 9b illustrates details of electronic appliance pocket 504, electronic appliance 505, charge control module pocket 506, containing charge control module 507. Charge control module 507 is configured for connecting a charging line to the electronic appliance 505, as illustrated by male adapter 520 which plugs into female adapter 522. Charge control module 507 includes a charge controller and a battery pack. LED lights 524 are provided to indicate a full or empty battery pack.

In a first exemplary solar charging handbag, the bag portion of a solar charging handbag is shaped similar to an opened paper grocery bag. The bag has a back panel that has an interior surface and an exterior surface. The back panel also has a top edge and a bottom edge and two side edges. There is also an opposing front panel with an interior surface and exterior surface and a top edge and a bottom edge and two side edges. The bag also has a first and second side panels. Each side panel has an interior surface and an exterior surface and a top edge and a bottom edge and two side edges. In the most preferred embodiments, the side edges of front panel, back panel, and two side panels are substantially all the same length. Also in the most preferred embodiments the top and bottom edges of both the front and back panel are substantially all the same length, and the top and bottom edges of the two side panels are substantially the same length. The bag is configured so that one side edge of the first side panel is attached to one side edge of the back panel and the second side edge of the first side panel is attached to one side edge of the front panel. Similarly, one side edge of the second side panel is attached to the second side edge of the back panel and the second side edge of the second side panel is attached to the second side edge of the front panel. Finally, the bag has a substantially rectangular or square bottom panel having four edges. Two opposing edges are substantially the same length as the bottom edges of the front and rear panels, and the other two opposing edges are substantially the same length of the top and bottom edges of the side panels. A first edge of the bottom panel having substantially the same length as the bottom edge of the front and rear panels is attached to the bottom edge of the back panel, a second bottom panel edge adjoining the first edge of the bottom panel is attached to the bottom edge of the first side panel, the edge opposing the first edge of the bottom panel is attached to the bottom edge of the front panel, and the fourth edge of the bottom panel is attached to the bottom edge of the second side panel. In this configuration it is seen that the interior surface of the back panel, the interior surface of front panel, the interior surface of first side panel, the interior surface of the second side panel, and the interior surface of the bottom panel establish an interior compartment with an opening at the top of the bag.

Continuing with the description of this first exemplary embodiment, the solar handbag has a solar panel that generates electrical energy when exposed to ambient light. The solar panel is affixed to the exterior surface of one panel of the bag. A fastening mechanism is disposed inside the interior compartment and affixed to the panel opposing the panel to which the solar panel is affixed, and a charge control module is securably restrained by the fastening mechanism. The charge control module has a charge control module and an electronic appliance plug receptacle for providing electrical energy to an electronic appliance. Further, there is an electrical connection between the charge control module and the solar panel whereby the charge control module accepts electrical energy from the solar panel through the electrical connection when the solar panel is exposed to ambient light and the charge control module provides electrical energy to the electronic appliance plug receptacle.

Some embodiments of this first exemplary solar charging handbag incorporate a second fastening mechanism for securably restraining an electronic appliance, where the second fastening mechanism is disposed inside the interior compartment and affixed to the panel opposing the panel to which the solar panel is affixed. Some embodiments of this first exemplary solar charging handbag have a flap panel that is attached to the top edge of the panel to which the charge control module is securably restrained by the fastening mechanism. The flap panel has an exterior and an interior surface, and it traverses the opening at the top of the bag, and the flap panel covers at least a portion of the exterior surface of the panel opposing the panel to which the charge control module is securably restrained by the fastening mechanism. In these embodiments the solar panel is attached to the exterior surface of the flap panel instead of the exterior surface of the panel opposing the panel to which the charge control module is securably restrained by the fastening mechanism.

A second exemplary solar charging handbag includes a bag comprising material that has an exterior surface and forms an interior compartment. This solar charging handbag also includes a solar panel having a negative terminal, and a built-in blocking diode with a positive output terminal. The solar panel is attached to the external surface of the bag and it generates electrical energy when exposed to ambient light. An electronic appliance plug receptacle disposed in the interior compartment. A first electrical connection is made between the positive output terminal of the built-in diode of the solar panel and the electronic appliance plug receptacle and a second electrical connection is made between the negative terminal of the solar panel and the electronic appliance plug receptacle, whereby the solar panel provides electrical energy to the electronic appliance plug receptacle through the electrical connection when the solar panel is exposed to ambient light.

In some embodiments of the second exemplary solar charging handbag the bag is configured in a manner similar to the bag described for the first exemplary solar charging handbag, and the solar panel is affixed to one of the exterior surfaces of a panel in that bag. Also, some embodiments include a first fastening mechanism for an electronic appliance that is affixed to the panel opposing the panel to which the solar panel is affixed. Some embodiments also include a second fastening mechanism affixed to the panel opposing the panel to which the solar panel is affixed for securably restraining either the electronic appliance plug receptacle or the electronic appliance itself. Further, some embodiments of this second exemplary solar charging handbag have a flap panel that is attached to the top edge of the panel to which the charge control module is securably restrained by the first fastening mechanism. The flap panel has an exterior and an interior surface, and it traverses the opening at the top of the bag, and the flap panel covers at least a portion of the exterior surface of the panel opposing the panel to which the charge control module is securably restrained by the fastening mechanism. In these embodiments the solar panel is attached to the exterior surface of the flap panel instead of the exterior surface of the panel opposing the panel to which the charge control module is securably restrained by the fastening mechanism.

In the most preferred embodiments of the first and second exemplary solar charging handbags the charge control module includes a rechargeable battery, and the solar panel and the electronic appliance plug receptacle are both connected to the rechargeable battery.

Some embodiments of the first and second exemplary solar charging handbags incorporate an exterior fastening mechanism on the exterior surface of the solar bag and a passageway from the interior compartment to the exterior surface where the passageway is proximate to the exterior fastening mechanism such that a second electrical connection can be made through the passageway to connect an electronic appliance to the electronic appliance plug receptacle while the electronic appliance is secured by the exterior fastening mechanism.

In some embodiments of the first and second exemplary solar charging handbags the charge control module includes at least one charging status visual indicator and the bag further comprises a viewing port through the material at a location whereby at least one charging status visual indicator can be observed from a vantage point perceptive of the exterior surface of the solar charging handbag.

In some embodiments, the electronic appliance plug receptacle comprises an automobile cigarette lighter female connector. In some embodiments, the bag comprises a back panel having a lateral dimension, and a fastening mechanism is provided that comprises a band of fastening material that extends substantially across the entire lateral dimension of the back panel. In the most preferred embodiments incorporating a band of and the fastening material the band of fastening material is affixed to the back panel in at least two locations separated to form at least one restraining chamber between affixing locations.

Some embodiments include a bag constructed of material that has an exterior surface and forms an interior compartment. Further, the bag has a lateral dimension with an axis of symmetry, and a transverse dimension perpendicular to the lateral dimension, and an axis of balance that is perpendicular to the axis of symmetry and parallel to the transverse dimension. These features provide balanced weight distribution for ease of carrying.

In the most preferred embodiments there is a first electrical connection between a charge control module and a solar panel and a second electrical connection between the rechargeable battery and the charge control module whereby the charge control module accepts electrical energy from the solar panel through the first electrical connection when the solar panel is exposed to ambient light and the charge control unit recharges the rechargeable battery through the second electrical connection, In some embodiments there are at least two fastening mechanisms in the interior compartment of the bag. One fastening mechanism securably often contains the charge control module and one fastening mechanism securably contains a rechargeable battery. Most preferably, these two fastening mechanisms position the charge control module and the rechargeable battery at distances away from an axis of symmetry such that the bag is substantially balanced about the axis of symmetry. Sometimes a fastening mechanism is provided in the interior compartment for restraining an electronic appliance. In some instances, a solar charging handbag includes a fastening mechanism on the exterior surface of the solar bag and a passageway through the material from the compartment to the exterior surface. Preferably, the passageway is proximate to an electronic appliance plug receptacle such that a second electrical connection can be made through the passageway to connect an electronic appliance to a charge control module the while the electronic appliance is secured by a fastening mechanism. Often an electrical connection is provided between the charge control module and the solar panel where the electrical connection passes from the solar panel through the exterior layer of the flap panel and continues between the exterior material layer and the interior material layer to the back panel where it passes through the interior material layer and connects to the charge control module.

In some embodiments the bag has a back panel having a lateral dimension and the interior compartment that includes a fastening mechanism. The fastening mechanism incorporates a band of fastening material that extends substantially across the entire lateral dimension of the back panel and the fastening mechanism is affixed to the back panel in at least two locations to form at least one restraining chamber. Preferably the restraining chamber is sized to securably restrain the charge control module, or an electronic appliance, or a battery pack.

A flap panel is incorporated in some solar charging handbags, and the flap panel and a back panel are both formed from a common exterior material layer and a common interior material layer. A solar panel is attached to the exterior material layer of the flap panel and it generates electrical energy when exposed to ambient light. Further, a compartment is formed at least in part by the interior material layer of the back panel. A charge control module and a rechargeable battery are disposed in the compartment. A first electrical connection is made between the charge control module and the solar panel, where the first electrical connection passes from the solar panel through the exterior layer of the flap panel and continues between the exterior material layer and the interior material layer to the back panel where it passes through the interior material layer and connects to the charge control module. A second electrical connection is made between the rechargeable battery and the charge control module, whereby the charge control module accepts electrical energy from the solar panel when the solar panel is exposed to ambient light and the charge control module recharges the rechargeable battery. An electronic appliance plug receptacle is connected to the rechargeable battery for providing electrical power to an electronic appliance.

In some solar charging handbags, the solar panel is installed between an interior material layer and the exterior material layer of a flap panel, and a window is cut in the exterior material layer of the flap panel such that the window exposes substantially all of the solar panel to ambient light.

Some embodiments incorporate an exterior fastening mechanism on the exterior surface of the solar bag and a passageway through the material from the interior compartment of the bag to the exterior surface, where the passageway is proximate to the exterior fastening mechanism such that an exterior electrical connection may be made through the passageway to connect an electronic appliance to an electronic appliance plug receptacle in the interior compartment of the bag while the electronic appliance is secured by the exterior fastening mechanism.

The foregoing description of alternate and preferred embodiments have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A solar charging handbag comprising:
   a compartment configured for holding an electronic appliance, the compartment having an exterior surface;
   a sheet material providing a portion of the exterior surface of the compartment;
   an aperture formed as an open window through the sheet material;
   a solar panel affixed to the sheet material adjacent the aperture and spanning the aperture and disposed to receive ambient light through the aperture and generate electrical energy; and
   a charge control module retained with the compartment, the charge control module configured to receive the electrical energy from the solar panel through an electrical connection lead and configured for connecting a charging line to the electronic appliance;
   wherein at least a portion of the electrical energy generated by the solar panel recharges the electronic appliance when the electronic appliance is connected to the charge control module through the charging line.

2. The solar charging handbag of claim 1 wherein the compartment comprises a front panel and the aperture is disposed in the front panel and the solar panel is a flexible solar panel mounted behind the aperture in the front panel.

3. The solar charging handbag of claim 2 wherein the solar panel comprises at least one solar cell having a front surface for receiving light and generating electrical energy and a back surface, and wherein the solar cell is laminated between a substantially transparent protective layer covering the solar cell front surface and a backing layer covering the back surface.

4. The solar charging handbag of claim 1 wherein the solar panel comprises at least one solar cell having a front surface for receiving light and generating the electrical energy and a back surface, and wherein the solar cell is laminated between a protective layer covering the solar cell front surface and a backing layer covering the back surface.

5. The solar charging handbag of claim 4 wherein the backing layer is attached to the sheet material in a configuration that positions the front surface of the solar cell to absorb ambient light through the aperture.

6. The solar charging handbag of claim 1 further comprising:
a rechargeable battery connected to the charge control module and connected to the charging line, wherein the charge control module and the rechargeable battery are configured to recharge the rechargeable battery when electrical power is available from the charge control module and to provide a reserve of power from the rechargeable battery when the electrical appliance is connected to the charging line.

7. The solar charging handbag of claim 1 further comprising a lining disposed in the compartment, and wherein the electrical connection lead between the solar panel and the charge control module passes at least in part between a portion of the sheet material and the lining.

8. A solar charging handbag comprising:
a compartment configured for holding an electronic appliance, the compartment having a front panel and an opening;
a flap formed from sheet material, the flap having a first portion that substantially covers the opening and a second portion constructed of sheet material that overlaps at least a portion of the front panel;
an aperture formed as an open window through the second portion;
a solar panel affixed to the sheet material adjacent the aperture and spanning the aperture and disposed to receive ambient light through the aperture and generate electrical energy;
a charge control module retained with the compartment, the charge control module configured to receive the electrical energy from the solar panel through an electrical connection lead and configured for connecting a charging line to the electronic appliance;
wherein at least a portion of the electrical energy generated by the solar panel recharges the electronic appliance when the electronic appliance is connected to the charge control module through the charging line.

9. The solar charging handbag of claim 8 wherein the solar panel is a flexible solar panel.

10. The solar charging handbag of claim 9 wherein the solar panel comprises at least one solar cell having a front surface for receiving light and generating electrical energy and a back surface, and wherein the solar cell is laminated between a substantially transparent protective layer covering the solar cell front surface and a backing layer covering the back surface.

11. The solar charging handbag of claim 8 further comprising:
a rechargeable battery connected to the charge control module and connected to the charging line, wherein the charge control module and the rechargeable battery are configured to recharge the rechargeable battery when electrical power is available from the charge control module and to provide a reserve of power from the rechargeable battery when the electrical appliance is connected to the charging line.

12. The solar charging handbag of claim 8 further comprising a lining disposed in the compartment, and wherein the electrical connection lead between the solar panel and the charge control module passes at least in part between a portion of the sheet material and the lining.

* * * * *